United States Patent Office 3,594,383
Patented July 20, 1971

3,594,383
PROCESS FOR THE PREPARATION OF HYDROXY-PHENAZINE-DI-N-OXIDES
Florin Seng, Cologne-Buchheim, and Kurt Ley, Odenthal-Globusch, Germany, assignors to Farbenfabriken Bayer Aktiengesellschaft, Leverkusen, Germany
No Drawing. Filed Jan. 27, 1969, Ser. No. 794,347
Claims priority, application Germany, Mar. 5, 1968,
P 16 70 994.7
Int. Cl. C07d 51/80
U.S. Cl. 260—267
13 Claims

ABSTRACT OF THE DISCLOSURE

Reacting [optionally 4- and/or 5- (chloro, alkyl and/or alkoxy)-substituted]-benzofurazan-N-oxide with (optionally 2-, 3- and/or 6-(mono or di -chloro, -phenyl and/or -chlorophenyl)-substituted]-benzoquinone or corresponding [optionally 2-(chloro, phenyl or chlorophenyl)-substituted]-naphthoquinone, in the presence of a diluent and at least an equimolar amount of an oxidizable basic agent at a temperature of about 0–100° C. to form the corresponding [optionally 1-, 3- and/or 4-(mono or di -chloro, -phenyl and/or -chlorophenyl)-substituted]-[optionally 6- and/or 7-(chloro, alkyl and/or alkoxy)-substituted]-2-hydroxy-phenazine-di-N-oxides and the corresponding orthobenzo-hydroxy-phenazine-di-N-oxides, all but the corresponding unsubstituted compound of which are new and all of which possess fungicidal properties.

The present invention relates to and has for its objects the provision for particular new methods of producing [optionally 1-, 3- and/or 4-(mono or di -chloro, -phenyl and/or -chlorophenyl)-substituted]-[optionally 61 and/or 7-(chloro, alkyl and/or alkoxy)-substituted]-2-hydroxy-phenazine-di-N-oxides and the corresponding orthobenzo-hydroxy-phenazine-di-N-oxides, all but the corresponding unsubstituted compound of which are new compounds and all of which possess fungicidal properties, e.g. in a simple single step reaction, using readily available starting materials whereby to attain outstanding yields, with other and further objects of the invention becoming apparent from a study of the within specification and accompanying examples.

It has not previously been known that benzofurazan-N-oxides can be reacted with quinones.

It has now been found, in accordance with the present invention, that certain optionally substituted hydroxy-phenazine-di-N-oxides, all but the corresponding unsubstituted compound of which are new compounds and all of which possess fungicidal properties, of the formula

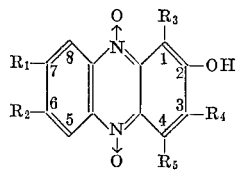

(I)

in which:

$R_1$ and $R_2$, each individually, is hydrogen, chloro, alkyl of 1–4 carbon atoms or alkoxy of 1–4 carbon atoms, and at least one of $R_3$, $R_4$ and $R_5$ correspondingly is hydrogen, and the remaining two of the radicals $R_3$, $R_4$ and $R_5$, each individually, is hydrogen, chloro, phenyl or chloro-substituted phenyl, with the proviso that $R_4$ and $R_5$ when taken together form a component of a fused benzine ring, may be provided by a process which comprises reacting benzofurazan-N-oxide of the formula

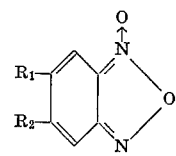

(II)

in which:

$R_1$ and $R_2$, each individually, is the same as defined above, with at least an equimolar amount of a benzoquinone of the formula

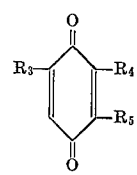

(III)

in which:

$R_3$, $R_4$ and $R_5$ are the same as defined above, at a temperature substantially between about 0–100° C. in the presence of a diluent as well as in the presence of at least an equimolar amount of an oxidizable basic agent such as a base or a basic-reacting salt, with optional neutralizing of the formed di-N-oxide after completion of the reaction by addition of an acid.

In copending U.S. application Ser. No. 794,345, filed simultaneously herewith, an analogous process is described and claimed for the production of hydroxy-phenazine-di-N-oxide by reacting an optionally substituted benzene compound with an optionally 4- and/or 5-position substituted benzofurazan-N-oxide in the presence of a base or basic-reacting salt, optionally in the presence of a diluent, e.g. at about 0–50° C. Such final compounds are usable as fungicidally active compounds, and all the corresponding substituted compounds are new.

Also, in copending U.S. application Ser. No. 794,346, filed simultaneously herewith, an analogous process is described and claimed for the production of ortho-benzo-phenazine-di-N-oxides by reacting an optionally 4- and/or 5-position substituted benzofurazan-N-oxide with an optionally substituted naphthol compound in the presence of a base or basic-reacting salt, and in the presence of a diluent, e.g. at about 0–100° C. Such final compounds are usable as fungicidally active compounds, and all the corresponding substituted compounds are new.

It is most surprising that benzofurazan-N-oxides can be reacted with benzoquinones in a smooth manner, to give hydroxy-phenazine-di-N-oxides when the reaction is carried out in the presence of a base or of a basic-reacting salt. The base or basic-reacting salt itself takes part in the reaction and is oxidized. Such a reaction course has not previously been known.

Advantageously, in accordance with the present invention, in the various formulae herein:

$R_1$ and $R_2$, each individually, represents hydrogen;
chloro;
lower alkyl of 1–4 carbon atoms such as methyl, ethyl, n- and iso-propyl, n-, iso-, sec.- and tert.-butyl, and the like, especially alkyl of 1–3 or 1–2 carbon atoms, and more especially methyl; or
lower alkoxy of 1–4 carbon atoms such as methoxy, ethoxy, n- and iso-propoxy, n-, iso-, sec.- and tert.-butoxy, and the like, especially alkoxy of 1–3 or 1–2 carbon atoms, and more especially methoxy and ethoxy; and At least one of $R_3$, $R_4$ and $R_5$ represents hydrogen; and
The remaining two of $R_3$, $R_4$ and $R_5$, each individually represents hydrogen;
chloro;
phenyl; or
chloro-substituted phenyl, i.e. 2-, 3- or 4-chlorophenyl, especially 2-chlorophenyl;

with the proviso that $R_4$ and $R_5$ when taken together form a component of a fused benzene ring with the remainder of the di-N-oxide or benzoquinone moiety.

In accordance with a preferred embodiment of the invention, $R_1$ is hydrogen; $R_2$ is hydrogen, chloro, $C_{1-4}$ or $C_{1-2}$ alkyl or $C_{1-4}$ or $C_{1-2}$ alkoxy; $R_3$ and $R_4$ are hydrogen; and $R_5$ is hydrogen, chloro, phenyl or chlorophenyl; with the proviso that $R_4$ and $R_5$ when taken together form a component of a fused benzene ring.

In particular, $R_1$, $R_3$ and $R_4$ are hydrogen, $R_2$ and $R_5$, each individually, is hydrogen or chloro.

The production process of the present invention is illustrated by the following reaction schemes:

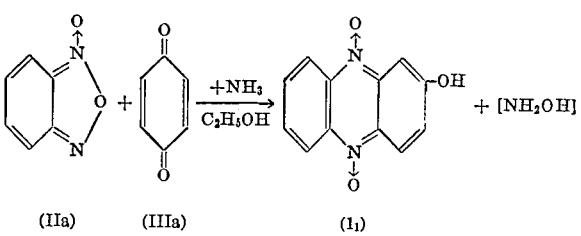

(IIa)   (IIIa)   ($I_1$)

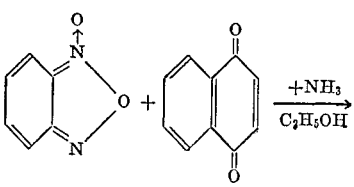

(IIa)   (IIIb)

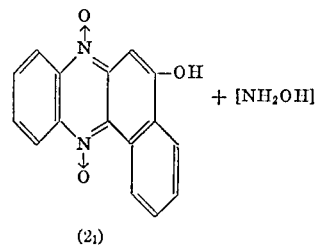

($2_1$)

Benzofurazan-N-oxides of Formula II above suitable for use as starting compounds in accordance with the process of the present invention include for example: benzofurazan-N-oxide and 5-methyl-, 5-ethyl, 5-n-propyl-, 5-isopropyl-, 5-n-butyl-, 5-tert.butyl-, 5-methoxy-, 5-ethoxy-, 5-n-propoxy-, 5-isopropoxy-, 5-n-butoxy-, 5-sec.-butoxy-, and the like, -benzofurazan-N-oxide.

Quinones of Formula III above suitable for use as starting compounds in accordance with the process of the present invention include for example: benzoquinone, chloro-benzoquinone, phenyl-benzoquinone, chlorophenyl-benzoquinone, naphthoquinone, and the like.

Basic-reacting agents, i.e. oxidizable basic agents such as bases or basic-reacting salts suitable for use in accordance with the process of the present invention include, for example, the alkali metal alcoholates of lower alcohols (up to 4 carbon atoms), i.e. alkali metal lower alkanolates, e.g. alkali metal $C_{1-4}$ alkanolates, in particular $KOCH_3$, $NaOCH_3$, $KOC_2H_5$, as well as $KOC_4H_9$-$n$, $NaOC_4H_9$-$n$, and the like. The hydroxides of alkali metals and alkaline earth metals, such as e.g. NaOH, KOH, $Ca(OH)_2$, and the like, are preferably used. Similarly, for carrying out the process according to the present invention the carbonates, bicarbonates, and cyanides of the alkali metals, such as $Na_2CO_3$, $K_2CO_3$, $NaHCO_3$, NaCN, KCN, and the like, may be used, as well as $NH_3$ and amines, especially organic or tertiary organic amines, of the general formula

(I)

in which:

$R_6$, $R_7$ and $R_8$, each individually, is alkyl (preferably of 1–12 carbon atoms), or aralkyl (preferably phenyl-substituted aliphatic in which the aliphatic chain preferably has 1–4 carbon atoms, e.g. benzyl), or $R_7$ and $R_8$ when taken together with the adjacent nitrogen atom form a piperidino or morpholino group, especially when $R_6$ is lower alkyl, especially $C_{1-4}$ alkyl, or the like.

Of course, mixtures of such alkali metal alcoholates, alkali metal hydroxides, alkaline earth metal hydroxides, alkali metal carbonates, alkali metal bicarbonates, alkali metal cyanides, ammonia, and/or organic amines, may also be used.

Preferred tertiary organic amines include: trimethylamine, triethylamine, N-methyl-piperidine, N-methylmorpholine, and the like.

In general, the bases and/or basic-reacting salts are employed in at least a stoichiometric amount with reference to the quinone used. Such bases or basic-reacting salts may, however, also be used in excess, the reaction time being considerably reduced when an excess amount of base or basic-reacting salt is used. The reaction product remains in solution in the form of its salt and can, if desired, subsequently be further reacted. The compound produced according to the process of the present invention can, however, also be isolated by the addition of a mineral acid or organic acid, e.g. lower, especially $C_{1-5}$, alkanoic acid, such as hydrochloric acid, sulfuric acid, formic acid, acetic acid, and the like.

The reaction is carried out in inert diluents such as water, and/or inert organic liquids, such as aliphatic alcohols (preferably 1–5 carbon atoms), especially alkanols, more especially lower, e.g. $C_{1-5}$, alkanols, aliphatic nitriles, especially lower, e.g. $C_{2-5}$, alkanoic acid nitriles, dialkyl formamides, especially di lower, e.g. $C_{1-5}$, alkyl formamides, cycloaliphatic ethers, especially $C_{4-5}$ cycloaliphatic ethers, such as methanol, ethanol, acetonitrile, propionitrile, dimethyl formamide, dioxan, tetrahydrofuran, and the like, or their mixtures with water, or benzene or carbon tetrachloride, at a temperature of substantially between about 0–100° C., preferably between about 10–50° C., in particular between about 20° C. to about 30° C.

The reaction may be carried out as follows:

1 mol of the benzofurazan-N-oxide and 1 mol of the quinone are provided in a diluent, and 1 mol of base or basic-reacting salt is added, for example dropwise. The intensely colored solution of the salt of the hydroxy-phenazine-di-N-oxide in question is obtained during the exothermic reaction, from which solution the free compound can be obtained by acidification, e.g. with hydrochloric acid. When working with $NH_3$ as base in organic solvents such as methanol or ethanol, or with $NaHCO_3$ or the like in water, the hydroxy-phenazine-di-N-oxide produced separates directly.

The compounds produced according to the present invention, with the exception of 2-hydroxy-phenazine-di-N-oxide, are new.

The so-produced hydroxy-phenazine-di-N-oxides can be used as intermediate products for the preparation of dyestuffs and plant protection agents.

Advantageously, the instant compounds can also be used directly as fungicides for the control of phytopathogenic, seed-born fungi such as *Tilletia tritici, Ustilago avenae, Ustilago tritici, Fusarium nivale, Helminthosporium gramineum*, and the like. In this case, the seed to be protected is treated in the usual manner with a dressing which contains as active compound at least one of the compounds produced according to the present invention alone or in admixture with a conventional inert solid or liquid diluent or carrier.

The active compounds produced according to the instant invention can be utilized, if desired, in the form of the usual formulations or compositions with inert conventional pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with inert conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

As will be appreciated by the artisan, the active compounds produced according to the instant invention may be employed alone or in the form of mixtures with one another and/or with such solid and/or liquid dispersible carrier vehicles and/or with other known compatible active agents, especially plant protection agents, such as other fungicides, or acaricides, insecticides, nematicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.01–50%, preferably 10–35%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.1–95%, and preferably 10–95%, by weight of the mixture.

The active compounds can also be used in accordance with the well-known ultra-low-volume process with good success, i.e. by applying such compound if normally a liquid, or by applying a liquid composition containing the same, via very effective atomizing equipment in finely divded form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling fungi, which comprise applying to at least one of (a) such fungi and (b) their habitat, i.e. the locus to be protected, e.g. seeds, a combative or toxic amount, i.e. a fungicidally effective or toxic amount, of the particular active compound of the invention alone or together with a carrier vehicle as noted above. The instant formulations or compositions are applied in the usual manner, for instance by spraying, atomizing, vaporizing, fumigating, scattering, dusting, watering, sprinkling, pouring, as seed dressing, and the like.

For seed dressing purposes, generally about 0.1–10, preferably 0.5–2, grams of active compound per kilogram of seed, are used.

It will be realized, of course, that the concentration of the particular active compound utilized in admixture the percentage spore germination obtained can be seen from the following Table 1:

TABLE 1.—SEED DRESSING TEST/BUNT OF WHEAT

| Active compound | Concentration of active compound in the dressing in percent by weight | Amount applied of dressing in g./kg. of seed | Spore germination in percent |
| --- | --- | --- | --- |
| ($1_2$) [phenazine-di-N-oxide-OH] | 30 | 1 | 0.5 |
| ($3_1$) [chloro-hydroxy-phenazine-di-N-oxide] | 30 | 1 | 0.05 |
| ($4_1$) [chloro-hydroxy-phenazine-di-N-oxide isomer] | 30 | 1 | 0.5 | with the carrier vehicle will depend upon the intended application. Therefore, in special cases, it is possible to go above or below the aforementioned concentration ranges.

The fungicidal activity of the active compounds produced by the process of the present invention is illustrated, without limitation, by the following example.

EXAMPLE 1

Seed dressing test/bunt of wheat (seed-born mycosis)

To produce a suitable dry dressing, the particular active compound is extended with a mixture of equal parts by weight of talc and kieselguhr to give a finely powdered mixture with the desired concentration of such active compound.

Wheat seed is contaminated with 5 g. of the chlamydospores of Tilletia caries per kg. of seed. To apply the dressing, the seed is shaken with the dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the given active compound.

The particular active compounds tested, their concentration in the dressing, the amount of dressing used and The production process of the present invention is illustrated, without limitation, by the following further example:

EXAMPLE 2

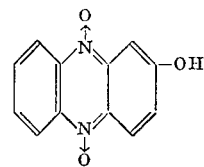
($1_3$)

136 g. (1 mol) benzofurazan-N-oxide and 108 g. (1 mol) benzoquinone are dissolved in 1000 ml. ethanol. Ammonia is introduced into this solution and the temperature is kept at about 25° C. to about 30° C. by occasional cooling. After 3 hours, suction filtration is effected and 210 g. (92.1% of the theory) of 2-hydroxy-penazine-di-N-oxide are obtained. The compound is violet-colored by adherent ammonia. After recrystallization from DMF, the compound melts at about 255° C. to about 260° C., with decomposition.

Analysis.—Calcd. for $C_{12}H_8N_2O_3$ (molecular weight 228) (percent): C, 63.2; H, 3.5; N, 12.2; O, 21.0. Found (percent): C, 62.9; H, 3.9; N, 12.2; O, 21.3.

Analogously, there were prepared:

| | | Color | M.P., °C. | Yield, percent |
|---|---|---|---|---|
| (4₂) | [structure: phenazine-di-N-oxide with Cl and OH] | Red | ¹ 188 | 72.4 |
| (5₁) | [structure: phenazine-di-N-oxide with CH₃ and OH] | Red | ¹ 203 | 82.7 |
| (6₁) | [structure: phenazine-di-N-oxide with CH₃O and OH] | Red | ¹ 207 | 77.5 |
| (7₁) | [structure: phenazine-di-N-oxide with C₂H₅O and OH] | Red | ¹ 194–95 | 71.5 |
| (2₂) | [structure: benzo-fused phenazine-di-N-oxide with OH] | Red | ¹ 217 | 54.3 |
| (8₁) | [structure: phenazine-di-N-oxide with OH and phenyl] | Red | ¹ 240 | 56 |
| (9₁) | [structure: phenazine-di-N-oxide with OH and chlorophenyl] | Red | ¹ 225 | 52.4 |

¹ Decomposition.

It will be realized by the artisan that all of the foregoing compounds contemplated by the present invention, i.e. produced by the instant process, possess the desired strong fungicidal properties, with regard to a broad spectrum of activity as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:

1. Process for the production of hydroxy-phenazine-di-N-oxide of the formula

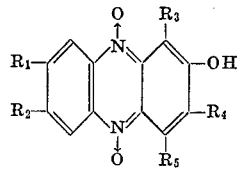

in which $R_1$ and $R_2$, each individually, is selected from the group consisting of hydrogen, chloro, alkyl of 1–4 carbon atoms and alkoxy of 1–4 carbon atoms, and at least one of $R_3$, $R_4$ and $R_5$ correspondingly is hydrogen and the remaining two of $R_3$, $R_4$ and $R_5$, each individually, is selected from the group consisting of hydrogen, chloro, phenyl and chloro-substituted phenyl; with the proviso that $R_4$ and $R_5$ when taken together form a component of a fused benzene ring, which comprises reacting a benzo-furazan-N-oxide of the formula

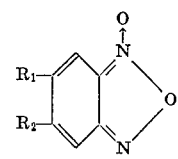

in which $R_1$ and $R_2$ are the same as defined above, with a benzoquinone of the formula

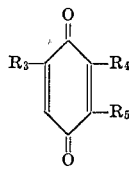

in which $R_3$, $R_4$ and $R_5$ are the same as defined above, in the presence of an inert diluent and at least an equimolar amount of an oxidizable basic agent at a temperature from about 0–100° C. to form the corresponding hydroxyphenazine-di-N-oxide.

2. Process according to claim 1 wherein said reacting is carried out at a temperature substantially between about 10–50° C.

3. Process according to claim 1 wherein said oxidizable basic agent is selected from the group consisting of bases and basis-reacting salts.

4. Process according to claim 1 wherein said oxidizable basic agent is selected from the group consisting of alkali metal acoholate, alkali metal hydroxide, alkaline earth metal hydroxide, alkali metal carbonate, alkali metal bicarbonate, alkali metal cyanide, ammonia, organic amine, and mixtures thereof.

5. Process according to claim 1 wherein said oxidizable basic agent is selected from the group consisting of alkali metal $C_{1-4}$ alkanolates, alkali metal hydroxide, alkaline earth metal hydroxide, alkali metal carbonate, alkali metal carbonate, alkali metal bicarbonate, alkali metal cyanide, ammonia, organic amine of the formula

in which $R_6$, $R_7$ and $R_8$, each individually, is selected from the group consisting of $C_{1-12}$ alkyl, phenyl-$C_{1-4}$ alkyl, with the proviso that $R_7$ and $R_8$ when taken together with the adjacent nitrogen atom form a member selected from the group consisting of piperidino and morpholino, and mixtures of such basic agents.

6. Process according to claim 1 wherein said oxidizable basic agent is ammonia.

7. Process according to claim 1 wherein said diluent is selected from the group consisting of water and inert organic liquids.

8. Process according to claim 1 wherein said inert diluent is an inert liquid selected from the group consisting of water, aliphatic alcohols, aliphatic nitriles, dialkyl formamides, cycloaliphatic ethers, and mixtures of the foregoing alcohols, nitriles, formamides and ethers with a member selected from the group consisting of water, benzene and carbon tetrachloride.

9. Process according to claim 1 wherein said inert diluent is an inert liquid selected from the group consisting of water, $C_{1-5}$ alkanols, $C_{1-5}$ alkanoic nitriles, di $C_{1-5}$ alkyl formamides, $C_{4-5}$ cycloaliphatic ethers, and mixtures of said alkanols, nitriles, formamides and ethers with a member selected from the group consisting of water, benzene and carbon tetrachloride.

10. Process according to claim 1 wherein said reacting is carried out with substantially equilmolar amounts of said benzofurazan-N-oxide, benzoquinone and basic agent.

11. Process according to claim 1 wherein the reaction mixture is neutralized with acid to form the corresponding free hydroxy compound.

12. Process according to claim 1 wherein $R_1$ is hydrogen, $R_2$ is selected from the group consisting of hydrogen, chloro, $C_{1-4}$ alkyl and $C_{1-4}$ alkoxy, $R_3$ and $R_4$ are hydrogen, and $R_5$ is selected from the group consisting of hydrogen, chloro, phenyl and chlorophenyl, with the proviso that $R_4$ and $R_5$ when taken together form a component of a fused benzene ring.

13. Process according to claim 1 wherein $R_1$, $R_3$ and $R_4$ are hydrogen, and $R_2$ and $R_5$, each individually, are selected from the group consisting of hydrogen and chloro.

References Cited
UNITED STATES PATENTS 3,485,832   12/1969   Harris et al. _____ 260—267

ALEX MAZEL, Primary Examiner

A. M. T. TIGHE, Assistant Examiner

U.S. Cl. X.R.

260—266, 307; 424—250